United States Patent
Ma et al.

(10) Patent No.: US 12,388,119 B2
(45) Date of Patent: Aug. 12, 2025

(54) HYDROCHLORIC ACIDIC SURFACE TREATMENT FOR MULTIVALENT BATTERY METAL ELECTRODE

(71) Applicant: U.S. Army DEVCOM, Army Research Laboratory, Adelphi, MD (US)

(72) Inventors: Lin Ma, Silver Spring, MD (US); Marshall A. Schroeder, Pasadena, MD (US); Oleg A. Borodin, Laurel, MD (US); Travis P. Pollard, Rockville, MD (US); Kang Xu, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/670,244

(22) Filed: May 21, 2024

(65) Prior Publication Data

US 2024/0387882 A1 Nov. 21, 2024

Related U.S. Application Data

(62) Division of application No. 17/583,303, filed on Jan. 25, 2022.

(51) Int. Cl.
| | |
|---|---|
| *H01M 10/38* | (2006.01) |
| *H01M 4/36* | (2006.01) |
| *H01M 4/485* | (2010.01) |
| *H01M 10/36* | (2010.01) |

(52) U.S. Cl.
CPC ........... *H01M 10/38* (2013.01); *H01M 4/366* (2013.01); *H01M 4/485* (2013.01); *H01M 10/365* (2013.01)

(58) Field of Classification Search
CPC ...... H01M 4/42; H01M 4/244; H01M 4/0438; H01M 4/04–0471; H01M 4/049–0497; H01M 12/085; H01M 2004/021; H01M 10/38–365; H01M 4/134; H01M 4/1395; H01M 4/26; H01M 4/38; H01M 4/366; H01M 4/485; H01M 10/365; Y02E 60/10;
(Continued)

(56) References Cited

FOREIGN PATENT DOCUMENTS

CN 113964289 A * 1/2022 ............ H01M 4/04

OTHER PUBLICATIONS

Wang et al., "Achieving Stable Molybdenum Oxide Cathodes for Aqueous Zinc-Ion Batteries in Water-in-Salt Electrolyte", Adv. Mater. Interfaces, pub. Feb. 2021, vol. 8, Iss. 9, p. 1-15 (Year: 2021).*

(Continued)

*Primary Examiner* — Allison Bourke
*Assistant Examiner* — Bethany C Garcia
(74) *Attorney, Agent, or Firm* — Emily C. Moscati

(57) ABSTRACT

To improve the performance of certain multivalent metal electrodes, the electrodes can be treated prior to use in an electrochemical cell by applying a solution comprising an acid to a surface of a multivalent metal electrode, then removing excess solution comprising the acid and drying the surface of the multivalent metal electrode. The resulting electrode has an outer interphase layer comprised of a hydrated hydroxychloride comprising the multivalent metal, where the interphase layer has a thickness of less than 5 μm.

4 Claims, 3 Drawing Sheets

(58) Field of Classification Search
CPC ..... C23C 22/05–14; C01G 9/02; Y02P 70/50; H01L 3924/0103; C08J 9/125; C25D 3/22
See application file for complete search history.

(56) References Cited

OTHER PUBLICATIONS

CN-113964289-A—English translation via Espacenet (Year: 2025).*
Moezzi et al., "Transformation of zinc hydroxide chloride monohydrate to crystalline zinc oxide", Dalton Trans., pub. 2016, 45, p. 7385-7390. (Year: 2016).*

* cited by examiner

HYDROCHLORIC ACIDIC SURFACE TREATMENT FOR MULTIVALENT BATTERY METAL ELECTRODE

BACKGROUND

Commercial applications of batteries with metal electrodes are ubiquitous. However, some metals, such as Zn, are currently generally limited to primary (non-rechargeable) systems. The majority of electrolytes for these metal electrode batteries are water-based, and suffer from reactivity between, e.g., Zn and water, leading to corrosion, self-discharge, hydrogen evolution, dendrite growth, and other parasitic reactions, which reduce the efficiency of the battery. Even state of the art optimized aqueous/non-aqueous electrolyte formations are not capable of cycling metal batteries at reasonable areal capacities (e.g., >1 $mAh/cm^2$) and current densities (e.g., >0.25 $mA/cm^2$) with high efficiency (e.g., >95%).

In order for rechargeable batteries with metal electrodes to be commercially viable, electrolytes with significantly higher efficiencies (e.g., improvements of >10-15%) must be developed.

The embodiments herein may be manufactured, used, and/or licensed by or for the United States Government without the payment of royalties thereon.

BRIEF SUMMARY

The present disclosure is drawn to providing such improved efficiencies through a novel acid-based surface treatment for metal anodes in multivalent (MV) battery metal anodes (e.g., Zn, Mg, Ca, Al, etc.). Through the use of this technique, the acid chemically etches metal oxides on the surface and forms, e.g., a chloride enriched interphase (when using HCl as the acid), which greatly enhances charge transfer kinetics and is favorable for plating/stripping of MV cations during cycling.

A first aspect of the present disclosure is drawn to the disclosed method for preparing or treating metal electrodes (preferably, anodes) prior to use in an electrochemical cell (such as a battery). The method involves applying a solution comprising an acid to a surface of a metal electrode, then removing excess solution and drying the surface of the metal electrode.

While any multivalent metal can be utilized, this method is advantageously directed towards metal electrodes comprising Mg, Al, Ca, Zn, or combinations thereof.

The acid is advantageously a single organic or inorganic acid (that is, the solution comprises only a single acid), while in some embodiments, a mixture of organic and inorganic acids are used. Such acids may include hydrochloric acid, sulfonic acid, acetic acid, sulfuric acid, trifluoroacetic acid, bis(trifluoromethane)sulfonic acid, fluorosulfonic acid, or a combination thereof. In a preferred embodiment, the solution consists of hydrochloric acid and water.

Advantageously, the concentration of the hydrochloric acid is at least 30% by weight of the solution. In preferred embodiments, the concentration is between 35% and 40% by weight of the solution.

In preferred embodiments, the solution is applied via spin coating, spray coating, or dip coating.

In preferred embodiments, the removal of excess solution comprising the acid begins very shortly after the solution is applied, such as within no more than 30 seconds, preferably no more than 5 seconds, and still more preferably no more than 1 second.

Advantageously, heat may be applied to the multivalent metal electrode after applying the solution comprising an acid.

Preferably, any excess solution is removed under vacuum conditions, preferably under a pressure of 100 millitorr or less, and/or at a temperature between 50° C. and 70° C.

A second aspect of the present disclosure is drawn to an electrode having undergone this treatment. Specifically, the electrode comprises (i) at least one metal layer comprising a multivalent metal selected from Mg, Al, Ca, Zn, or a combination thereof; and (ii) an interphase layer external to the at least one metal layer, the interphase layer comprising a hydrated hydroxychloride, the hydrated hydroxychloride comprising the multivalent metal. The interphase layer will generally have a thickness less than 5 µm, preferably less than 2 µm, and more preferably between 0.1 µm and 1.5 µm.

In some embodiments, the hydrated hydrochloride may have the formula $ZnO$—$ZnCl_2$-$2H_2O$ or $Zn(OH)_2$—$ZnCl_2$—$H_2O$ or a related material assumed to have the same space group as ZnOHCl (Pbca), or otherwise have a crystal structure belonging to the orthorhombic crystal family.

A third aspect of the present disclosure is drawn to an electrochemical cell for repeatedly plating and stripping an electrode, where the electrode underwent the disclosed treatment. For repeatedly plating and stripping at electrode. The electrochemical cell comprises an electrode as described above, at least one additional electrode, and an electrolyte.

DETAILED DESCRIPTION

Figure 1:
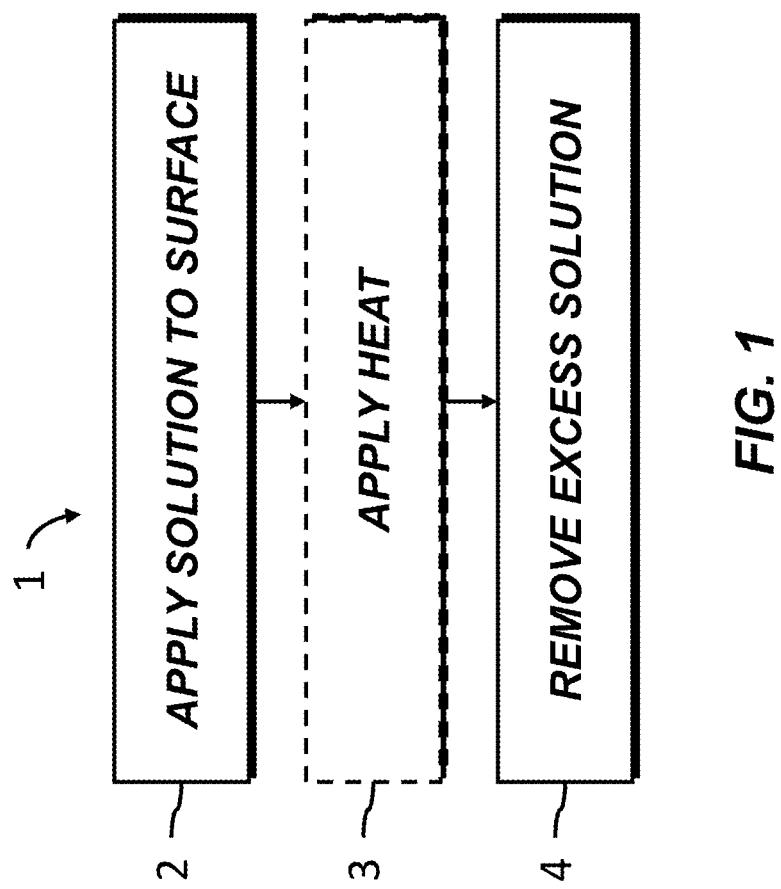
FIG. 1 is flowchart of an embodiment of the disclosed method.

Embodiments of the present disclosure are described in detail with reference to the figures wherein like reference numerals identify similar or identical elements. It is to be understood that the disclosed embodiments are merely examples of the disclosure, which may be embodied in various forms. Well known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The term "electrochemical cell" or "cell" as used herein is intended to refer to a device that converts chemical energy into electrical energy, and/or electrical into chemical energy. Generally, cells will have two or more electrodes and an electrolyte, and in use, reactions occurring at the surface of the electrodes results in charge transfer processes.

The term "electrode" may refer to a "cathode" or an "anode". The terms "cathode" refers to the electrode having the higher of electrode potential in an electrochemical cell (i.e., higher than the anode). Conversely, the term "anode"

refers to the electrode having the lower of electrode potential in an electrochemical cell (i.e., lower-than the cathode). Cathodic reduction refers to a gain of electron(s) of a chemical species, and anodic oxidation refers to a loss of electron(s) of a chemical species.

The term "electrolyte" refers to an ionic conductor which may be, e.g., in a solid state (including a gel), or in a liquid state. Generally, electrolytes are present in the liquid state.

The term "solvent" as used herein is intended to refer to a liquid that at least substantially or completely dissolves a solid, liquid, or gaseous solute, resulting in a solution. Liquid solvents can dissolve electron acceptors and electron donor metals in order to facilitate transfer of electrons from the electron donor metal to the electron acceptor.

Disclosed is a method for preparing or treating a multivalent metal electrode prior to use in an electrochemical cell. Referring to FIG. 1, the method 1 comprises first applying 2 a solution comprising an acid to a surface of a multivalent metal electrode.

While any multivalent metal electrode may suffice, preferred embodiments, utilize an electrode comprising Mg, Al, Ca, Zn, or a combination thereof. More preferably, the electrode comprises a bivalent metal such as Mg, Ca, or Zn. Most preferably, the metal comprises Zn.

In some embodiments, the electrode is composed of an alloy comprising one of these multivalent metals.

Any appropriate acid may be utilized in the solution.

In some embodiments, the acid is a single inorganic acid (i.e., the solution consists of a solvent and a single acid, that acid being an inorganic acid). In some embodiments, the acid is a single organic acid. In some embodiments, the acid is a mixture of at least one organic acid and at least one inorganic acid.

Non-limiting examples of acids useful in the disclosed method comprise hydrochloric acid, sulfonic acid, acetic acid, sulfuric acid, trifluoroacetic acid, bis (trifluoromethane) sulfonic acid, fluorosulfonic acid, or a combination thereof.

In preferred embodiments, the acid comprises Cl or F. In a more preferred embodiment, the acid is hydrochloric acid, and in a most preferred embodiment, the solution consists of hydrochloric acid and water.

It is generally desired to have a relatively high concentration of acid in the solution. In preferred embodiments, the concentration of the acid is at least 30% by weight of the solution, and more preferably, the concentration is between 35% and 40% by weight of the solution.

The solvent in the solution can be any appropriate solvent for the selected acid. In preferred embodiments, the solvent is water.

The solution can be applied to the surface in any appropriate manner, and such techniques are well-understood in the art. In some preferred embodiments, the solution is applied to the surface via spin coating. In some preferred embodiments, the solution is applied to the surface via spray coating. In some preferred embodiments, the solution is applied to the surface via dip coating.

Referring again to FIG. 1, at some point in time after the solution has been applied, the process 1 may optionally include applying heat 3 to the multivalent metal electrode after the solution has been applied to the surface. This can be done by any appropriate means, including, e.g., applying direct heat via, e.g., a hotplate, an infrared heating element, etc.

At any time after the solution has been applied (including before, during, or after heat has optionally been applied), the process 1 continues by removing 4 excess solution and drying the surface of the multivalent metal electrode.

Preferably, this removal of excess solution begins within a relatively short period of time after the solution has been applied. In some embodiments, that period of time is no more than 30 seconds. In preferred embodiments, the period of time is no more than 5 seconds. And in some embodiments, that period of time is no more than 1 second.

In some embodiments, the excess solution is removed under vacuum conditions. In some preferred embodiments, the vacuum is 100 millitorr or less.

In addition, the temperature of the electrode may be controlled during the removal process. In some preferred embodiments, the surface of the electrode is maintained between 50° C. and 70° C. while under vacuum.

Figure 2B:
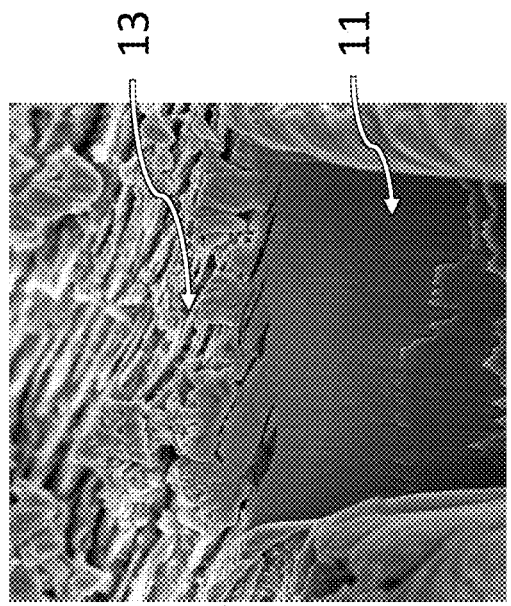
FIG. 2B is a FIB-SEM image of a cross-section of an HCl-treated Zn metal electrode.
Figure 2A:
FIG. 2A is a simplified representation of an electrode after treatment.

The result of this treatment can be seen with reference to FIGS. 2A and 2B.

As a result of the aforementioned treatment, disclosed is an electrode 10 comprising at least one metal layer 11 comprising a multivalent metal selected from Mg, Al, Ca, Zn, or a combination thereof. External to that layer, preferably on an external surface 12 of the at least one metal layer 11, will exist an interphase layer 13. The interphase layer 13 will comprise a hydrated hydroxychloride, hydrated hydroxyflouride, or hydrated hydroxysulfate, and will comprise the multivalent metal.

The interphase layer will have a thickness 14. The thickness is generally less than 5 μm, preferably less than 2 μm, and more preferably between 0.1 μm and 1.5 μm. In some embodiments, the thickness is at least 0.1 μm. In some embodiments, the thickness is at least 0.5 μm. In some embodiments, the thickness is at least 1 μm.

In a preferred embodiment, the interphase layer will have the composition $M(OH)_n$—$MX_n$—$H_2O$, where n=2 or 3, M is a bivalent metal, and X is a halogen or an acid ion (such as a sulfonic acid ion, acetic acid ion, sulfuric acid ion, etc.). In a more preferred embodiment, the composition is $Zn(OH)_2$—$ZnCl_2$—$H_2O$. In some embodiments, the composition is a fluoride-based interphase having a chemistry analogous to those observed for HCl. In some embodiments, composition may be, e.g., $Zn(OH)_2$—$ZnF_2$—$H_2O$.

The resulting electrode can be used in an electrochemical cell for repeatedly plating and stripping an electrode. The electrochemical cell (such as a battery), comprises an electrode as described above, at least one additional electrode, and an electrolyte. The electrodes are in contact with the electrolyte. There is typically a container or housing around at least a portion of the electrodes and the electrolyte.

The additional electrode may be comprised of any appropriate material for an electrode. In some embodiment, a metal electrode is utilized.

The electrolyte may be any appropriate electrolyte, generally comprising a solvent, a salt, and optional additives (which, if present, are typically used in a total concentration of 10% or less by weight).

Example 1

Measuring Coulombic Efficiency

In this example, a Ti—Zn cell setup was used, with Ti as the working electrode and Zn as the counterelectrode, Zn source, and reference. The Ti is cycled galvanostatically (a constant current) to plate the Zn to a certain capacity, at which point the current is reversed and the Zn is stripped from the copper. In one test, a pristine Zinc electrode was used, and in another, a Zinc electrode treated using HCl (dipped quickly in 15M HCl, followed quickly by removing excess solution under vacuum at 50° C.). In both tests, the electrolyte was 0.5M $Zn(TFSI)_2$ in acetonitrile.

Substrate effects (lattice mismatch, alloying, interphase effects, etc.) are mitigated by an initial substrate conditioning cycle, in which 5 mAh/cm$^2$ of Zn is plated on and stripped from the Cu working electrode. Following this substrate conditioning step, a Zn reservoir formation step occurs, where a 5 mAh/cm$^2$ "Zn reservoir" is subsequently plated on the Cu to provide a quantitatively limited and well-controlled source of Zn for accurate CE determination ($Q_R$). A fraction of this plated Zn reservoir (approximately 20%) is then cycled nine times at a fixed capacity of 1 mAh/cm$^2$ ($Q_C$) at a rate of 0.5 mA/cm$^2$, followed by stripping to a preselected upper cut-off voltage (0.5 V vs Zn/Zn2+), at which all removable Zn should be stripped, including the initial reservoir ($Q_S$). The CE is calculated as CE=($9Q_C$-30 $Q_S$)/($9Q_C$+$Q_R$). In this protocol, a moderate current density and a modest number of cycles were deliberately selected to avoid anomalous CE measurements from effects such as Zn dendrite formation or excessive impedance growth. Electrodes allowing more metal to be reversibly plated/stripped have a higher CE, and are more commercially viable for rechargeable metal batteries.

The relation between Coulombic efficiency and cycle life is generally understood as $(CE)^N$=Capacity Retained at N Cycles. That is, if a cell has a Coulombic Efficiency of 90% and it is cycled 5 times, only 59% of the capacity is retained. If the CE is improved to 95% and the cell is cycled 5 times, 77% of the capacity is retained, a massive increase.

Figure 3A:
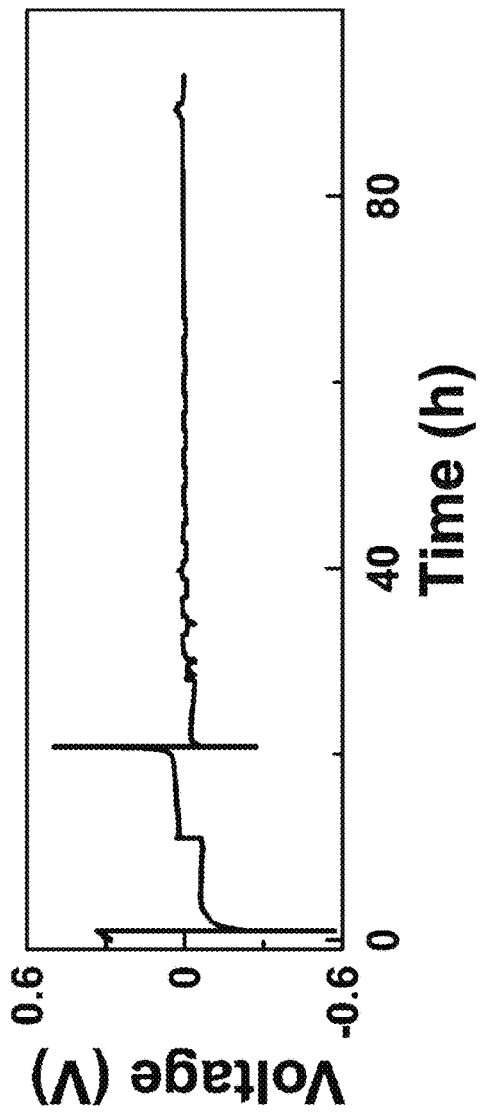
FIG. 3A is a graph showing the results of a test of Coulombic efficiency (CE) for a pristine Zinc electrode.

Here, as seen in FIG. 3A, the pristine Zn metal failed to complete the test protocol, indicating an unacceptable performance.

Figure 3B:
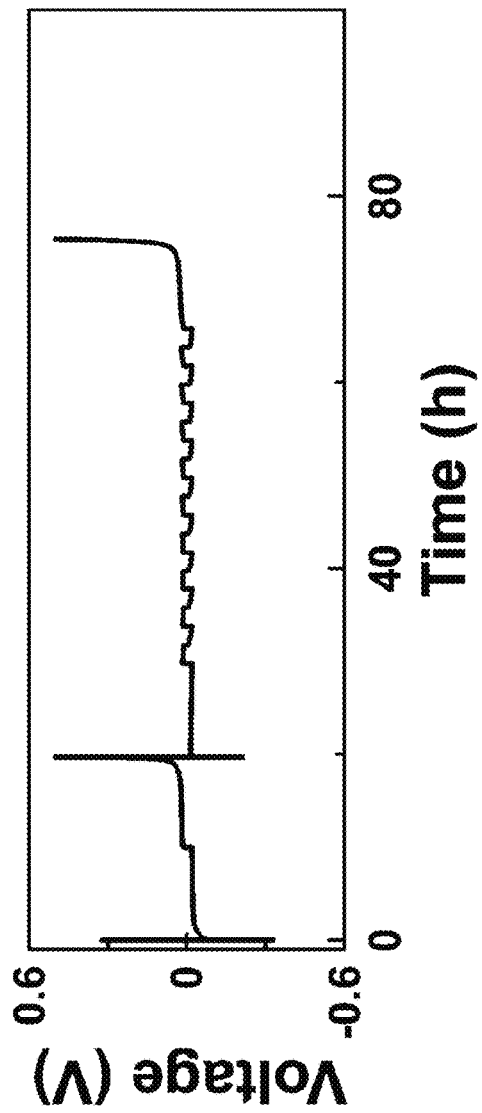
FIG. 3B is a graph showing the results of a test of Coulombic efficiency (CE) for a Zinc electrode treated using the disclosed method.

However, as seen in FIG. 3B, the HCl-treated Zn anode exhibited an efficiency of 98.75%, which is a very efficiency, and an extreme improvement over the pristine Zn metal electrode performance.

Other acidic treatments offer similar performances levels, and metals other than zinc (excepting Lithium) exhibit similar improvements when treated as described above.

Example 2

To further test the effect of the surface treatment on cycle life, a symmetric Zn|Zn cell was used to test pristine and HCl-treated Zn electrodes as described above. In a first test, the cell was cycled at a fixed capacity of 5 mAh/cm$^2$ at a rate of 1 mA/cm$^2$.

The HCl-treated Zn electrodes showed an almost 50× improvement in cycling lifetime, increasing cycling stability with a commercialization required areal capacity (5 mAh/cm$^2$), from ~40 hours for the pristine Zn electrodes to more than ~2000 hours for the HCl treated Zn electrodes. Voltage polarization is also dramatically decreased. This HCl-treated cell was still running when the test was stopped.

In a more aggressive second test, the cell was cycled at a fixed capacity of 5 mAh/cm$^2$ at a rate of 2.5 mA/cm$^2$. Similar improvements in performance to the first test were seen in this second test, but the HCl-treated cell in the bottom plot did fail around 1100 hours, which is still a remarkable improvement under such aggressive conditions.

Those skilled in the art will recognize or be able to ascertain using no more than routine experimentation many equivalents to the specific embodiments of the invention described herein. Such equivalents are intended to be encompassed by the following claims.

What is claimed is:

1. An electrode comprising:
   at least one metal layer comprising a multivalent metal selected from Mg, Al, Ca, Zn, or a combination thereof; and
   an interphase layer external to the at least one metal layer, the interphase layer comprising a hydrated hydroxychloride, the hydrated hydroxychloride comprising the multivalent metal and has the formula $Zn(OH)_2$—$ZnCl_2$—$H_2O$;
   wherein the interphase layer has a thickness less than 5 μm.

2. The electrode according to claim 1, wherein the thickness is less than 2 μm.

3. The electrode according to claim 1, wherein the thickness is between 0.1 μm and 1.5 μm.

4. An electrochemical cell for repeatedly plating and stripping at electrode, comprising:
   an electrode comprising
   at least one metal layer comprising a multivalent metal selected from Mg, Al, Ca, Zn, or a combination thereof; and
   an interphase layer external to the at least one metal layer, the interphase layer comprising a hydrated hydroxychloride, the hydrated hydroxychloride comprising the multivalent metal and has the formula $Zn(OH)_2$—$ZnCl_2$—$H_2O$;
   wherein the interphase layer has a thickness less than 5 μm;
   at least one additional electrode; and
   an electrolyte.

* * * * *